Jan. 19, 1960  H. A. TOULMIN, JR  2,921,681
STERILIZER FOR SEPTIC TANK EFFLUENTS
Filed Sept. 26, 1957
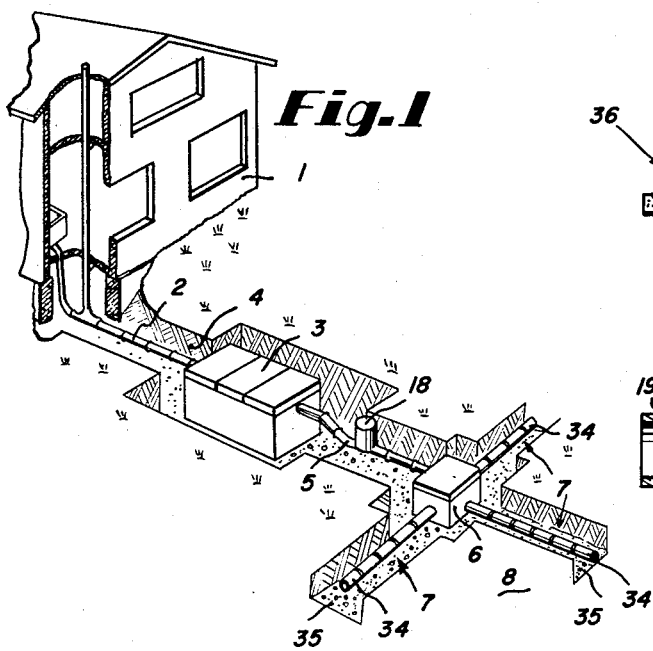
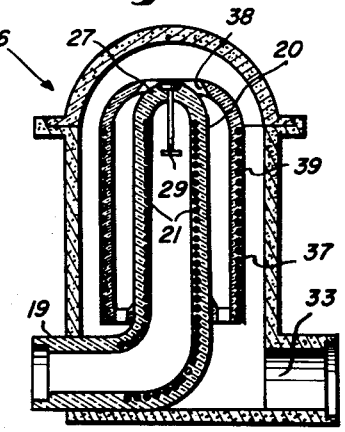
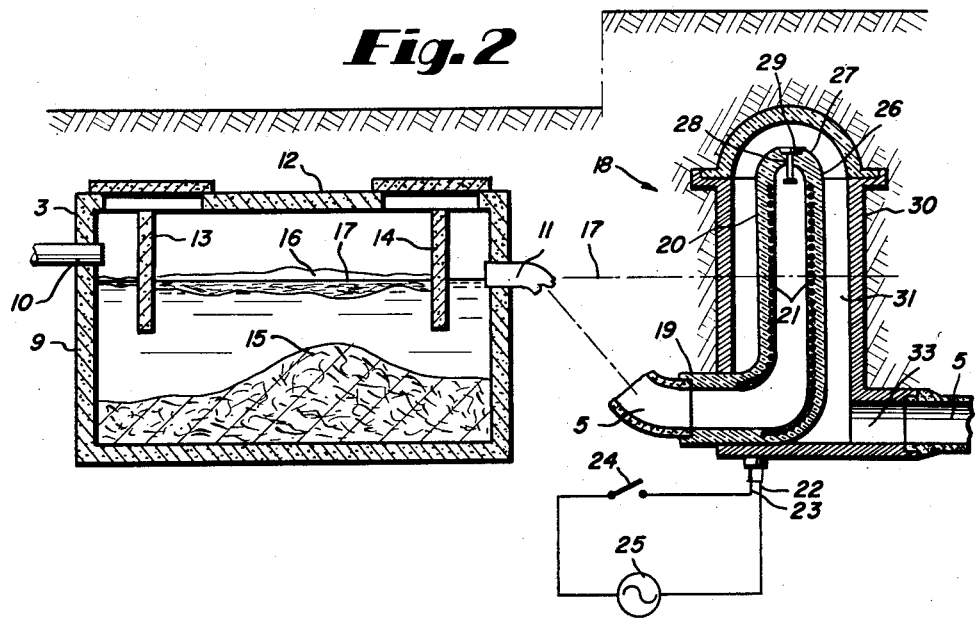
INVENTOR
HARRY A. TOULMIN, Jr.
BY
ATTORNEYS United States Patent Office 2,921,681
Patented Jan. 19, 1960

2,921,681

STERILIZER FOR SEPTIC TANK EFFLUENTS

Harry A. Toulmin, Jr., Dayton, Ohio, assignor to The Commonwealth Engineering Company of Ohio, Dayton, Ohio Application September 26, 1957, Serial No. 686,349

10 Claims. (Cl. 210—71)

The present invention relates to an improvement in sewage disposal, more particularly to an apparatus and method of purifying septic tank liquid effluent by steam sterilization prior to discharge in the absorption field.

The disposal of wastes is becoming increasingly more of a problem as the population of this country increases. Furthermore, as established communities become more built up, various problems arise in the disposition of household sewage. Household sewage ordinarily consists of human waste, toilet paper, garbage, dish water, and other wash water from the various plumbing fixtures and floor drains. In built-up communities, an organized sewage disposal system is used for the removal of these wastes.

In some communities, however, which are sparsely settled or the individuals reside at great distances from each other, other steps must be taken to dispose of the household sewage. The most effective means of disposing of this sewage is through the use of a septic tank and its related absorption field.

However, in those areas where the use of septic tanks has been common, the disposal of household sewage by the use of septic tanks is becoming limited and many municipalities are now imposing restrictions on the construction of new septic tanks. This problem is primarily due to the high water level in the soil, which prevents quick drain-off of septic tank effluent from the absorption field. Since it is difficult to decrease the number of septic tanks per unit area once they have been installed, other procedures must be taken to prevent unhealthy, ill-smelling and unsanitary situations, particularly in those crowded areas without municipal sewage disposal systems. The present invention, therefore, proposes to reduce the problem relating to the use of septic tanks by treating the effluent prior to conveying the effluent to the absorption field. By treating the effluent so that a considerable amount of bacteria is removed therefrom, the effluent which is ultimately received within the absorption field has been greatly purified and consequently the land area necessary for the absorption field would be decreased.

The purpose of a septic tank is to receive household wastes such as soapy water from the laundry and the bath, scattered food scraps, body wastes, etc. The solids settle to the bottom of the tank and the liquid passes out into the leeching system where it seeps out and is absorbed into the soil. Bacteria in the soil then remove some of the impurities from the liquid wastes.

All solids in the sewage are retained in the septic tank either by settling to the bottom or by the action of the baffles at both the inlets and outlets of the septic tanks. Consequently, the effluent which is discharged from the septic tank does not contain any solid particles but only bacteria. The present invention proposes to remove a considerable portion of this bacteria by a process of sterilization.

It is known that steam sterilization at 15 lbs. pressure for 20 mins. kills all known forms of microorganisms. While these ideal conditions could not be continuously maintained in the treatment of septic tank effluent, nevertheless, a steam sterilization of the effluent for a shorter period of time and at a lower pressure will greatly reduce the number of bacteria so as to reduce the area of the absorption field necessary for the effluent. The effluent which is so treated is substantially clear and contains only a small percentage of the bacteria present when the effluent was discharged from the septic tank.

It is therefore the principal object of this invention to provide a simple and effective apparatus for the sterilization of the septic tank liquid effluent to result in an effluent having an extremely low percentage of bacteria.

It is another object of this invention to provide an improved septic tank disposal system wherein the effluent discharged from the septic tank is purified before distribution to the absorption field.

It is an additional object of this invention to provide a septic tank disposal system which requires a smaller absorption field and may therefore be used in more densely populated areas without presenting problems of sanitation.

It is another object of this invention to utilize the constant temperature of the ground several feet below the surface of the ground to condense the vapors formed from the effluent by the sterilization process whereby the condensed vapors result in a substantially uncontaminated clear effluent.

Further objects and advantages of this invention will become apparent upon reference to the accompanying description when taken in conjunction with the following drawings wherein:

Figure 1 is an over-all perspective view with portions thereof removed showing the location of the apparatus of the present invention in a conventional septic sewage disposal system for a dwelling;

Figure 2 is a vertical sectional view of the sterilization apparatus and septic tank shown generally in Figure 1 with the sterilization apparatus being in much greater scale; and Figure 3 is a modification of the sterilization apparatus shown in Figure 2 which includes an additional condensation surface.

This invention is based on the concept of steam sterilizing the septic tank effluent and condensing the vapors, utilizing the ground as a source of low temperature, with the condensed vapors forming a substantially clear effluent which is distributed to the absorption field.

Proceeding now to the drawings, more particularly to Figure 1, wherein like reference symbols indicate the same parts throughout the various views, 1 indicates a dwelling which is to be serviced by a septic tank sewage disposal system. A house sewer 2 leads from the house plumbing to a septic tank 3 which is located in the ground indicated at 4. A line 5 connects the septic tank with a distribution box 6 which is connected to the tile basin 7 in the absorption field 8.

The septic tank as indicated in Figure 2 is conventional in construction and comprises an outer casing 9 having an inlet 10 and an outlet 11 and covered with a top 12. Inlet and outlet baffles 13 and 14, respectively, are provided adjacent their respective openings.

The septic tank performs three functions to provide protection for the absorption ability of the subsoil. These functions are (1) removal of solids, (2) biological treatment of the sewage, and (3) sludge and scum storage.

As may be seen in Figure 2, the sludge indicated at 15 is an accumulation of solids at the bottom of the tank, while the scum 16 is a partially submerged mat of floating solids that may form at the surface of the liquid within the tank. The level of the liquid within the tank is indicated at 17 and it can be seen that this level is even with the outlet 11. Sludge, and scum to a lesser degree, will be digested and compacted into a smaller volume. However, no matter how efficient the process is, a residue of inert solid material will remain.

The conventional septic tank operates by settling the heaviest sewage solids to the bottom of the tank, forming a blanket of sludge. The lighter solids, including fats and greases, rise to the surface and form a layer of scum. A considerable portion of the sludge and scum are liquified through decomposition or digestion. During this process, gases liberated from the sludge carry a portion of the solids to the surface where they accumulate with the scum. Ordinarily, they undergo further digestion in the scum layer and a portion again settles to the sludge blanket on the bottom.

Septic tanks do not accomplish a high degree of bacteria removal. Although the sewage undergoes treatment in passing through the tank, this does not mean that infectious agents will be removed. Hence septic tank effluents cannot be considered safe. The liquid that is discharged from the tank is in some respects more objectionable than that which goes in. It is septic and malodorous. This, however, does not detract from the value of the tank. As previously explained, its primary purpose is to condition the sewage so that it will cause less clogging of the disposal field.

Final purification of the effluent, including the removal of pathogens, is effected by percolation through the soil. Disease-producing bacteria will in time die out in the unfavorable environment afforded by the soil. In addition, bacteria are also removed by certain physical forces during filtration. This combination of factors results in eventual purification of the sewage effluent. This purification of the effluent in the sewage, however, will only occur if the absorption field is of considerable area. The present invention provides for additional purification of the effluent prior to distribution in the absorption field, and hence will reduce the required area for the field.

The sterilizing apparatus indicated generally at 18 is located in the line 5 between the septic tank and the distribution box. The sterilizer comprises an elbow 19 which is connected to a vertically upstanding ceramic pipe 20. A heating coil 21 of tungsten wire or the like is imbedded in the vertical pipe 20 as may be seen in Figure 2. The ends of the heating coil as indicated at 22 and 23 are carried through a wall of the elbow where they are connected to a control switch 24 and subsequently to a source of electric power indicated at 25. The switch 24 is preferably located in the dwelling and may be of the manual type. Also, the switch 24 may be of the automatic type in that it is set to operate for a predetermined length of time at periodic times during the day when the amount of sewage discharged from the dwelling is at a maximum.

The top of the vertical pipe 20, as indicated at 26, is covered with a hemispheric cap 27 having a central opening 28 therein. A pressure safety valve 29 is mounted within the opening 28. The safety valve will open only after the pressure has been built up within the vertical pipe by the presence of vapors because of the heating effect of the coils.

The vertical pipe 20 is surrounded by a metallic casing 30 which forms a condensation chamber 31 between the pipe 20 and the casing 30.

Adjacent the bottom of the condensation chamber indicated at 32 is an opening 33 which connects to the line leading to the distribution box.

While the invention has been described as utilizing a single vertical pipe being connected to the septic tank outlet, it may be preferable in some situations to use a plurality of vertical pipes, each with heating coils imbedded therein. The use of multiple vertical pipes with heating coils will subject a greater amount of the liquid effluent to the heating effect of the coil. The result is a sterilizer of a greater capacity.

The subsurface tile basin system 7 comprises a field of approximately 12-inch lengths of agricultural drain tile, vitrified clay sewer pipe, or perforated non-metallic pipe, laid in such a manner that flow from the septic tank will be distributed with reasonable uniformity into the natural soil. The individual laterals indicated at 34 are laid in trenches and are surrounded by a coarse aggregate 35.

In the operation of the apparatus of this invention, the switch 24 is turned on either manually or through an automatic timer. The liquid effluent from the septic tank is then conveyed through the outlet 11 into the presence of the heating element 21. The diameter of the vertical pipe 20 is smaller than the diameter of the conduit 11 so that a greater surface area of the liquid is exposed to the action of the heating coils. As the liquid within the vertical pipe is vaporized, sufficient pressure is built up within the pipe to open the safety valve 29. The vapors escape into the condensation chamber 31 where they are condensed on the inner sides of the casing 30. The condensation chamber is located several feet below the surface of the ground. The temperature of the ground at this distance below the surface is a constant temperature of approximately 50° F. Consequently, the ground surrounding the condensation unit is utilized to condense the vapors from the vertical pipe 20. As the vapors are condensed into a clear effluent, they are collected on the bottom of the condensation chamber to flow outwardly through the line 5 into the distribution box. The distribution box then apportions substantially equal amounts of the effluent to the various laterals of the tile basin system. Since the effluent reaches the absorption field in a purified state, the function of the absorption field has been greatly reduced.

There is no necessity for providing any means in the elbow 19 for collecting any solid particles, since the effluent as it is discharged from the septic tank does not contain any solid particles. These solid particles, as previously described, settle out into a sludge upon the bottom of the tank. Hence, the effluent is a liquid containing only bacteria. These bacteria, however, are in large part eliminated by the aforementioned sterilization process.

Proceeding next to Figure 3, there is illustrated a modification which comprises a dual heating chamber. In this modification, indicated generally at 36, a casing 37 is mounted over the vertical pipe 20. The casing has an opening 38 at the top thereof, which opening is close to the edges of the top 27 of the vertical pipe. Heating coils 39 are similarly imbedded in the surrounding casing 37. The casing 37 with its heating coils is for the purpose of vaporizing any liquid effluent which may escape through the safety valve 28. Any escaping effluent will pass between the casing 37 and the vertical pipe 20, where it will be vaporized under the action of the heating coils in both the casing and the vertical pipe.

The modification is a more efficient sterilization apparatus since the dual vaporizing units greatly decrease the possibility of any unsterilized effluent being conveyed from the sterilization apparatus.

While the invention has been described as being applied to septic tank effluent containing no solids but only bacteria, it may be also applied to raw sewage. In this example, it would be preferable to initially filter the sewage to remove the solids. The filtrate could then be passed through a purifier as described above.

A greater heating effect may be obtained in the purifier if the coils are connected to a source of high frequency electric current rather than the conventional 60-cycle current. Such a current could have a frequency of several thousand cycles per second.

Thus it can be seen that the present invention provides a simple and effective method and apparatus for the treatment of septic tank effluent prior to the distribution of this effluent in an absorption field. Consequently, an absorption field of considerably less area is required. Also, the health problem is greatly decreased since the effluent which does reach the absorption field has been considerably purified so that there is little danger of a malodorous effluent escaping to the surface of the ground. Furthermore, the sterilization apparatus is extremely simple in operation, has no moving parts, and merely requires a source of electric current. By operating the apparatus only at those times when necessary and not constantly, the cost of operating such an apparatus will be greatly reduced.

It will be understood that this invention is susceptible to modification in order to adapt it to different usages and conditions, and, accordingly, it is desired to comprehend such modifications within this invention as may fall within the scope of the appended claims.

What is claimed is:

1. In combination, a septic tank, an outlet from said septic tank for the passage of an aqueous liquid effluent therefrom, heating means on said outlet to vaporize the water effluent therein, and means for receiving water vapors from said outlet and condensing the vapors to form a purified effluent for ultimate disposition in the ground.

2. In combination, a septic tank, an outlet extending from said septic tank for the passage of an aqueous liquid effluent therefrom, a heating coil surrounding said outlet for vaporizing the liquid effluent and to form water vapors, means for receiving the water vapors from said outlet and condensing the same to form a purified water.

3. In a combination as claimed in claim 2, with said heating coil being embedded within said outlet.

4. In combination, a septic tank, an outlet passage from said septic tank to convey an aqueous liquid effluent therefrom, said outlet being bent upwardly and having an opening at the uppermost portion of said bent portion, heating means surrounding said outlet about the bent portion thereof for vaporizing the liquid effluent and to form water vapors, and means surrounding said bent portion to receive the water vapors from said outlet for condensing the same.

5. In combination, a septic tank positioned in the ground, an outlet passage from said septic tank to convey an aqueous liquid effluent therefrom, said outlet having an upwardly bent portion with an opening in the uppermost part of said bent portion, and a condensation chamber in the ground surrounding said outlet to receive water vapors therefrom to condense the same to form a purified effluent.

6. In combination, a septic tank positioned in the ground, an outlet passage from said septic tank to convey an aqueous liquid effluent therefrom, said outlet having an upwardly bent portion with an opening in the uppermost part of said bent portion, a condensation chamber in the ground surrounding said outlet to receive water vapors therefrom to condense the same to form a purified effluent, and an outlet extending from said condensation chamber to convey the purified water from said chamber to disposition in the ground.

7. In combination, a septic tank mounted in the ground, an outlet extending from said septic tank for the passage of an aqueous liquid effluent therefrom, said outlet having an upwardly bent portion with an opening in the uppermost part of said bent portion, heating means on said outlet above said bent portion to vaporize the effluent therein and to form water vapors, a condensation chamber surrounding said outlet and utilizing the temperature of the ground for condensing water vapors from said outlet to form purified effluent.

8. In the method of purifying the discharge from a septic tank, the steps of vaporizing the liquid effluent, condensing the vapor to form a purified effluent, and conveying the purified effluent into the ground for disposition therein.

9. In combination, a septic tank, an outlet passage extending from said septic tank for the passage of a liquid effluent therefrom and turned upwardly at its other end to a substantially vertical position, a tube-like member connected to the up-turned end of said outlet conduit, heating means surrounding said tube-like member, a housing enclosing said tube-like member and said heating element but having an opening at its upper surface thereof registering with the upper end of said tube-like member, second heating means in said housing, a second chamber enclosing said housing for the collection of vapors and the liquid effluent discharged from said tube-like member, and a second conduit extending from the lower portion of said second housing for distributing the liquid effluent into the ground.

10. In combination, a septic tank positioned in the ground and having an outlet therefrom, and means on said outlet to evaporate and condense the liquid effluent from said septic tank to purify the effluent before distribution in the ground.

References Cited in the file of this patent

UNITED STATES PATENTS

| | | |
|---|---|---|
| 669,966 | Rose | Mar. 12, 1901 |
| 1,346,537 | Flowers | July 13, 1920 |
| 1,577,675 | Ballman | Mar. 23, 1926 |
| 1,931,838 | Beraud | Oct. 24, 1933 |